(12) United States Patent
Riedmueller et al.

(10) Patent No.: US 11,073,408 B2
(45) Date of Patent: Jul. 27, 2021

(54) ROTARY SENSOR ARRANGEMENT AND METHOD FOR DETERMINING A FAILURE STATUS OF SUCH ARRANGEMENT

(71) Applicant: ams AG, Premstaetten (AT)

(72) Inventors: Kurt Riedmueller, Premstaetten (AT); Simone Sabatelli, Graz (AT)

(73) Assignee: AMS AG, Premstaetten (AT)

( * ) Notice: Subject to any disclaimer, the term of this patent is extended or adjusted under 35 U.S.C. 154(b) by 64 days.

(21) Appl. No.: 16/340,716

(22) PCT Filed: Oct. 11, 2017

(86) PCT No.: PCT/EP2017/075950
§ 371 (c)(1),
(2) Date: Apr. 10, 2019

(87) PCT Pub. No.: WO2018/073072
PCT Pub. Date: Apr. 26, 2018

(65) Prior Publication Data
US 2019/0310113 A1      Oct. 10, 2019

(30) Foreign Application Priority Data
Oct. 18, 2016   (EP) ..................................... 16194358

(51) Int. Cl.
*G01D 5/244*     (2006.01)
*G01D 5/14*      (2006.01)

(52) U.S. Cl.
CPC ......... *G01D 5/24466* (2013.01); *G01D 5/145* (2013.01)

(58) Field of Classification Search
CPC .......................... G01D 5/24466; G01D 5/145
See application file for complete search history.

(56) References Cited

U.S. PATENT DOCUMENTS

2015/0226581 A1 *   8/2015   Schott .................... G01D 5/145
                                                                   324/207.2

FOREIGN PATENT DOCUMENTS

| DE | 10 2015011617 | 3/2016 |
| DE | 10 2015105854 | 10/2016 |
| EP | 2 888 558 | 7/2015 |

(Continued)

OTHER PUBLICATIONS

European Patent Office, International Search Report for PCT/EP2017/075950 dated Jan. 31, 2018.

*Primary Examiner* — Clayton E. LaBalle
*Assistant Examiner* — Michael A Harrison
(74) *Attorney, Agent, or Firm* — MH2 Technology Law Group LLP (57) ABSTRACT

A rotary sensor arrangement is configured to be used with a rotatable magnetic source and comprises a first and a second pair of magnetic field sensors, each pair arranged symmetrically with respect to rotation axes and providing respective sensor values. An evaluation unit determines a first sum value corresponding to a sum of the sensor values of the first pair, and a second sum value corresponding to a sum of the sensor values of the second pair. The evaluation unit further determines a difference value corresponding to a difference between the first and the second sum value and compares the difference value or a value derived thereof to a threshold value. Based on the comparison result, it is determined whether a failure status of the sensor arrangement is present.

20 Claims, 6 Drawing Sheets

(56) References Cited

FOREIGN PATENT DOCUMENTS

WO 2008/107300 9/2008
WO 2014/029885 2/2014

\* cited by examiner

ROTARY SENSOR ARRANGEMENT AND METHOD FOR DETERMINING A FAILURE STATUS OF SUCH ARRANGEMENT

The present disclosure relates to a rotary sensor arrangement, which particularly is to be used with a rotatable magnetic source. The disclosure further relates to a method for determining a failure status of such arrangement.

BACKGROUND OF THE INVENTION

Rotary sensor arrangements are widely used for angular position measurement. For the purpose of such measurements, such arrangements usually comprise several symmetrically arranged magnetic field sensors, wherein at least a first and a second pair of sensor elements are arranged symmetrically with respect to a rotation axis of a magnetic source, respectively. Depending on a geometrical projection of the magnetic field vector generated by the magnetic source onto respective axes of the magnetic field sensors, corresponding sensor values are generated and used to determine the angle of the magnetic field, i.e. the measured quantity. To this end, in conventional applications, a difference value of the sensor values of each pair is used for further evaluation, thereby eliminating or reducing effects of external homogenous magnetic fields.

The respective sensor arrangements usually further comprise signal amplifiers and sometimes analog-to-digital converters together with a processing core for evaluating the digital signals in order to determine the rotation angle.

If one or more of the concerned elements, e.g. the magnetic field sensors, the amplifying circuitry or the signal evaluation, has a failure, the determination of the rotation angle can be erroneous. Moreover, if the magnetic field sensor is not working properly or as expected, but still delivers a sensor signal, the error may not be detected in conventional systems. Such a situation may be critical, particularly for automotive or security relevant applications.

SUMMARY OF THE INVENTION

The present disclosure provides a failure detection concept, which allows to determine a failure status of a rotary sensor arrangement with improved reliability.

The failure detection concept is based on the idea that by using a rotary sensor arrangement with a first and a second pair of magnetic field sensors, where each pair is arranged symmetrically with respect to a common rotation axis, the sensor values provided by the magnetic field sensors cannot only be used for angle determination but also for determination of a potential failure status. Such determination of the failure status is based on a different signal evaluation of the respective sensor values compared to that of the angle measurement. In particular, the sensor values of each pair are summed up to determine a first and a second sum value. Due to the symmetric arrangement, summing up the sensor values of one pair results in zero, assuming that the magnetic field generated by the magnetic source is dominant and an external magnetic field is small.

Furthermore, the difference between the sums of any two pairs becomes zero, as the effects of the external field cancel out each other, assuming a more or less homogenous external magnetic field. This is also true if more than two pairs of sensors are present in the arrangement. Hence, such difference values between the sums of the two pairs can be evaluated to be within certain limits during proper operation, but exceeding such limits if a failure in one or more magnetic field sensors or the associated amplifying circuits is present.

This is also true if more than two pairs of sensors are present in the arrangement. Hence, the failure detection concept can be extended for arrangements with three, four or more pairs of magnetic field sensors, using the same principle of comparing the sum values of the respective pairs to each other. For all configurations, the failure detection can be performed at least partially in parallel to a conventional angle determination.

The evaluation can also be performed within or after a processing core for the angle determination, which may be a digital core comprising efficient trigonometric operations, like a CORDIC processor. By employing operations of such a core on the sum values or the difference of the sum values, the functionality of the core can be checked in addition or as an alternative.

The failure detection concept allows e.g. detecting a broken or degraded Hall element or connected signal processing circuits, like Hall Current Source, Frontend Amplifier and Chopping Multiplexer, in a rotary sensor arrangement, e.g. a digital rotary encoder. It is possible to detect also two broken Hall elements in non-symmetrical position or three broken Hall elements in any position. It is also possible to extend the failure detection concept to have some fault detection for the digital part related to the CORDIC calculation that is inside the processing portion, also called the Magneto Core.

According to an example implementation of the failure detection concept, a rotary sensor arrangement is configured to be used with a rotatable magnetic source. The sensor arrangement comprises a first pair of magnetic field sensors arranged symmetrically with respect to a rotation axis, wherein the magnetic field sensors of the first pair are configured to provide a first and a second sensor value. The rotation axis, for example, is more or less coincident to a rotation axis of the rotatable magnetic source to be used with the arrangement. The sensor arrangement further comprises a second pair of magnetic field sensors that are arranged symmetrically with respect to the rotation axis. The magnetic field sensors of the second pair are configured to provide a third and a fourth sensor value. For example, the sensor values correspond to the magnetic field generated by the magnetic source. The magnetic source may be a permanent magnet.

The sensor arrangement further comprises an evaluation unit. The evaluation unit determines a first sum value corresponding to a sum of the first and the second sensor value, determines a second sum value corresponding to a sum of the third and the fourth sensor value, and determines a difference value corresponding to a difference between the first and the second sum value. The evaluation unit compares the difference value or a value derived from the difference value to a threshold value, and determines whether a failure status of the sensor arrangement is present based on the comparison result.

In some embodiments, the sensor arrangement further comprises at least one further pair of magnetic field sensors arranged symmetrically with respect to the rotation axis. The magnetic field sensors of the at least one further pair are configured to provide respective sensor values, wherein the evaluation unit is configured to determine a respective further sum value corresponding to a sum of the respective sensor values of the at least one further pair of magnetic field sensors. The further sum value contributes to the difference value.

For example, the sensor arrangement comprises a third pair of magnetic field sensors providing a fifth and a sixth sensor value resulting in a third sum value. In addition, the sensor arrangement may comprise a fourth pair of magnetic field sensors providing a seventh and an eighth sensor value resulting in a fourth sum value. All of the sum values can be compared to any other of the sum values by performing respective combinations of calculations.

In various implementations, the difference value is directly compared to the threshold value in the analog domain or in the digital domain. In particular, the failure status is determined to be present if the difference value is greater than the threshold value. The difference value may be formed as an absolute value to ignore signs of difference signals. For performing the comparison in the digital domain, the sensor values or the sum values or the difference value may be converted to the digital domain by using analog-to-digital converters. The threshold value may be provided by a programmable threshold generator, e.g. providing a threshold voltage in the analog domain. In the digital domain, the threshold value may be programmed directly.

In some implementations, the evaluation unit is further configured to determine a first component value and a second component value based on at least a first, second, third and fourth sensor value. For example, the first component value corresponds to a sine channel value and a second component value corresponds to a cosine channel value. The evaluation unit further determines a rotation angle based on the first component value and the second component value, e.g. by employing a trigonometric function like the A TAN 2-function. The evaluation unit determines a first, a second and a third vector value based on respective distinct combinations of the difference value and the first and second component value.

A first auxiliary angle is determined based on the first and the second vector value, and a second auxiliary angle is determined based on the second and the third vector value. The evaluation unit determines a residual value based on the first and second auxiliary angle and on the rotation angle. A failure status is determined based on a comparison of the residual value with the threshold value or with a further threshold value. For example, the determination of the failure status can be performed as an alternative or in addition to a direct comparison of the difference value with a threshold value.

Employing the determination of the vector values etc. allows to determine whether an erroneous operation may be present in an evaluation core that is used for determining the rotation angle of a rotating magnetic source.

For example, the failure status may include a sensor status portion and a processing status portion, the sensor status portion being determined based on the difference value, and a processing status portion being determined based on the residual value.

For example, a failure status of the sensor status portion is determined to be present if the difference value is greater than the threshold value, and a failure of the processing status portion is determined to be present if the residual value is greater than the further threshold value.

It is also possible to determine the failure status only including a processing status portion without the sensor status portion. In any case, the processing status portion will show a failure, if one or more of the magnetic field sensors have an error.

In some implementations, where the vector values etc. are determined, additional calculations have to be performed compared to a conventional angle determination based on the first and the second component value. In such cases, the determination of the difference value, the first component value and the second component value may at least be partially performed in a time multiplexed fashion.

For example, one of the first component value and the second component value is determined by a prediction algorithm during determination of the difference value. In addition, or as an alternative, the rotation angle may be determined by a prediction algorithm during determination of the difference value.

In the following, a method for determining a failure status of a rotary sensor arrangement according to the failure detection concept is disclosed. Such rotary sensor arrangement has a first pair of magnetic field sensors arranged symmetrically with respect to the rotation axis, a second pair of magnetic field sensors arranged symmetrically with respect to the rotation axis, and a rotatable magnetic source. According to the method, a first sum value is determined corresponding to a sum of a first and a second sensor value provided by the magnetic field sensors of the first pair, and a second sum value is determined corresponding to a sum of a third and a fourth sensor value provided by the magnetic field sensors of the second pair. A difference value corresponding to a difference between the first and the second sum value is determined. This difference value or a value derived from this difference value is compared to a threshold value. Based on the comparison result, it is determined whether the failure status of the sensor arrangement is present.

Various embodiments and implementations of such a method become apparent to the skilled reader from the description of the various embodiments of the sensor arrangement described above. The magnetic field sensors employed in the various embodiments e.g. are Hall sensors like lateral Hall sensors or vertical Hall sensors, e.g. in CMOS implementation. However, other magnetic field sensors, e.g. using a magneto resistive effect, can also be used with the failure detection concept.

What is covered from the failure detection concept is the failure of the sensors itself, but also of any polarizing circuits of the sensors, the failure of the following signal amplifier on the channel and every failure on the chip that can change or drift the sensitivity of each magnetic field sensor. Sensitivity here is the relation between the output voltage of the signal chain and the magnetic field measured by the sensor.

The failure detection concept can be extended to check also the correct functionality of a part of the Magneto Core, in particular the CORDIC IP that makes the sine and cosine conversion to an angle.

Detecting the sensitivity drift of a magnetic field sensor or also a zero signal output from the sensor or the failure of the digital Magneto Core is important to detect when the measured angle is not correct or not reliable anymore and to flag this to the end user that will take the proper safety relevant decisions.

The failure detection concept increases the fault coverage of a chip implementing the concept and to reach higher Automotive Safety Integrity Level, ASIL, qualification, necessary for automotive or security relevant applications. The failure detection concept is also first order insensitive to external homogeneous magnetic DC fields and magnet displacement.

BRIEF DESCRIPTION OF THE DRAWINGS

The invention will be described in detail below for several embodiments with reference to the drawings. Identical reference numerals designate elements or components with identical functions. In so far as elements or components correspond to one another in function, a description of them will not be repeated in each of the following figures.

In the drawings.

DETAILED DESCRIPTION

Figure 1:
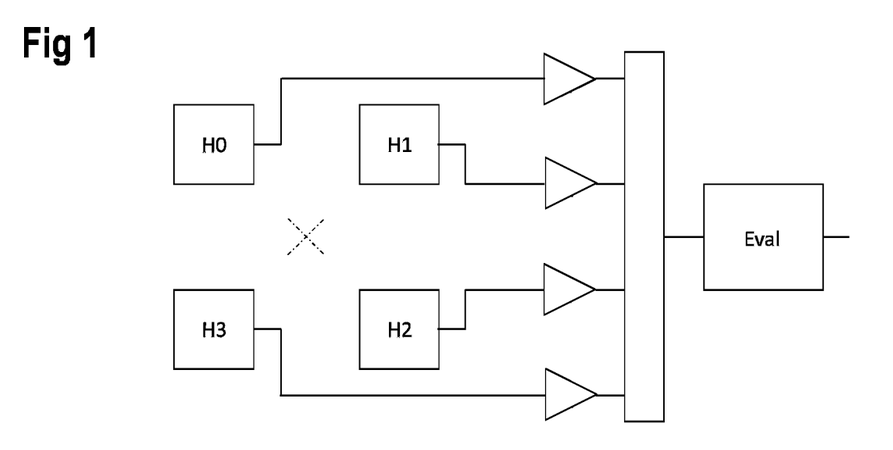
FIG. 1 shows an example embodiment of a rotary sensor arrangement employing the failure detection concept.

FIG. 1 shows an example embodiment of a rotary sensor arrangement depicted on a block diagram basis. The arrangement comprises a first pair of magnetic field sensors H0, H2 arranged symmetrically with respect to a rotation axis that is indicated with a dash-dotted cross. A second pair of magnetic field sensors H1, H3 is also arranged symmetrically with respect to the rotation axis, but is arranged rotated around the rotation axis with respect to the first pair of magnetic field sensors H0, H2. The sensor arrangement is configured to be used with a rotatable magnetic source that e.g. is placed over the sensor arrangement such that the rotation axis of the magnetic source coincides with the rotation axis of the sensor arrangement. As is well-known for conventional rotary sensor arrangements, a displacement angle between the two pairs of magnetic field sensors may approximately be 90°.

Each of the magnetic field sensors H0-H3, which for example are formed by Hall sensors like CMOS Hall sensors, provides a respective sensor value corresponding to the intensity of the magnetic field sensed at the sensor's position. In particular, for the first pair of magnetic field sensors, sensor H0 provides a first sensor value, sensor H2 provides a second sensor value, and for the magnetic field sensors of the second pair, sensor H1 provides a third sensor value and sensor H3 provides a fourth sensor value. Respective sensor signals of the magnetic field sensors are combined after respective amplification and provided to an evaluation unit Eval.

The evaluation unit Eval may perform signal evaluation in order to determine a rotation angle of the magnetic source which is well-known in the art. However, according to the failure detection concept the evaluation unit Eval is configured to determine a first sum value corresponding to a sum of the first and the second sensor value, and to determine a second sum value corresponding to a sum of the third and the fourth sensor value. In other words, the sensor values of each pair are summed up to determine a respective sum value for that pair.

The evaluation unit is further configured to determine a difference value corresponding to a difference between the first and the second sum value. According to various implementations, the difference value or a value derived from the difference value are compared to a threshold value. Based on the comparison result of that comparison, the evaluation unit determines whether a failure status of the sensor arrangement is present.

It should be noted that for the conventional angle determination, differences of the sensor values in each pair are formed. This has the effect that signals arising from any homogenous magnetic field being present at both sensors of one pair at least approximately cancel out each other.

In contrast, summing up the sensor values of one pair, according to the failure detection concept, results in zero or approximately zero, assuming that the field of the magnetic source is dominant and an external homogenous field is small. In particular, only the external homogenous field components contribute to the sum value of each pair. The difference between the first and the second sum value becomes zero as the effects of the external field cancel out each other.

According to some implementations, the difference value is evaluated directly, while according to other implementations, a value derived from the difference value is evaluated. Some of such implementations will be described in the following.

Figure 2:
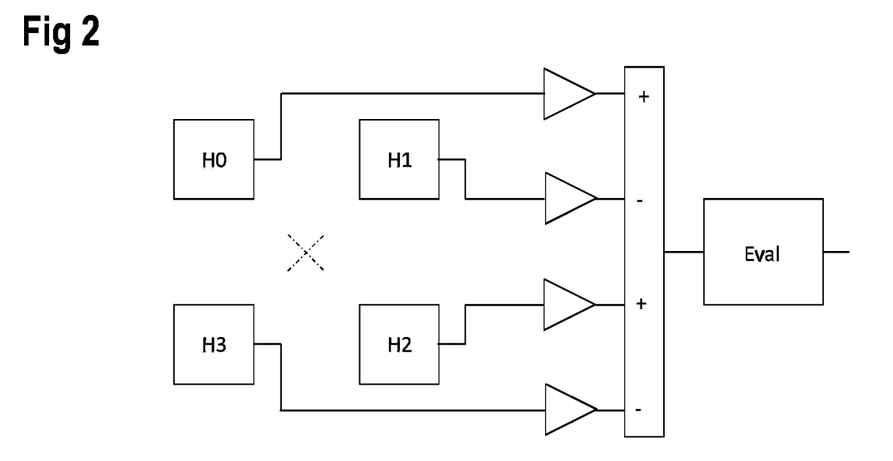
FIG. 2 shows a further example embodiment of a rotary sensor arrangement employing the failure detection concept.

For example, FIG. 2 shows an example implementation of the arrangement of FIG. 1 where the signals provided by the magnetic field sensors H0 to H2 are specifically combined in the combination block before providing the combined signal to the evaluation unit Eval. With SU1 as the first sum value, SU2 as the second sum value, VH0, VH1, VH2, VH3 as respective sensor values of the sensors H0 to H2, the combination can be written as $SU1=VH0+VH2,$ $SU2=VH1+VH3,$ and $F=SU1-SU2=VH0+VH2-VH1-VH3,$ with F being the difference value that is provided to the evaluation unit Eval.

The evaluation unit Eval can directly evaluate the difference value F or perform further processing of the difference value F together with other combinations of the sensor values.

Figure 3:
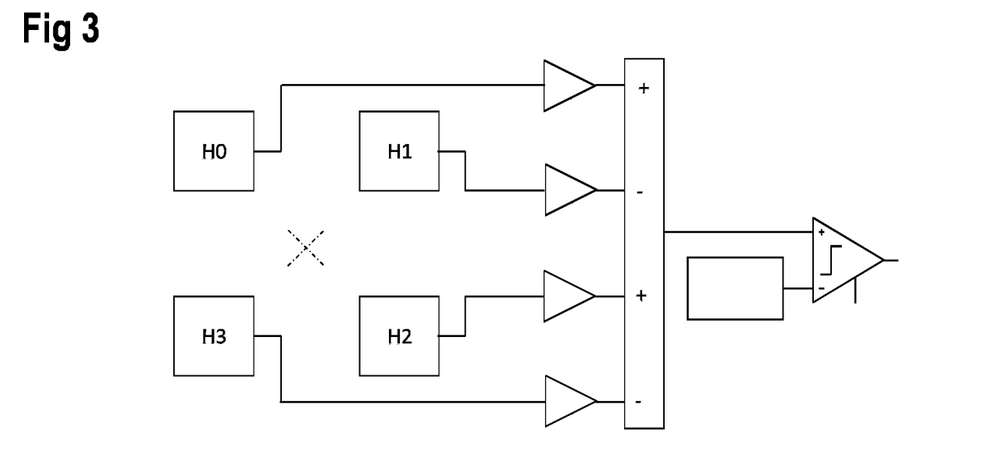
FIG. 3 shows a further example embodiment of a rotary sensor arrangement employing the failure detection concept.

Referring for example to FIG. 3, the difference value F is compared to a threshold value with a conventional analog comparator or with a comparison in the digital domain. If the difference value F is greater than the threshold value, a failure is to be assumed for at least some of the magnetic field sensors and/or the amplification circuits and/or combination circuit or other involved circuitry.

This allows to detect a single broken sensor and two broken sensors in non-symmetric position, e.g. H0 and H1, or H0 and H3, or H1 and H2, or H2 and H3. Three broken sensors are always detected.

As explained before, the expected value for the difference value F is zero if all the magnetic field sensors have the same sensitivity and there is no external magnetic field disturbance with a certain gradient. Also a magnet displacement, e.g. deviation between the rotation axes, may lead to a non-zero value of the difference value F. Therefore, the threshold value, which theoretically may be set to zero, e.g. is chosen to some value that takes into account possible sources of disturbances. However, it should be noted that in a failure situation the difference value can be expected to have a significant deviation from zero, which is higher than those arising from conventional disturbances and misalignments.

It is possible to program the voltage threshold of the comparator to have different sensitivities for this fail-safe mechanism to have a trade-off between the robustness to external disturbances, e.g. external magnetic field, magnet displacement, and detection sensibility. E.g. the maximum undetected angle error in case of failure directly depends from this.

To this end, the threshold value may be provided by a programmable threshold generator, e.g. providing a threshold voltage in the analog domain. In the digital domain, the threshold value may be programmed directly.

As described before, conventional rotary sensor arrangements perform an evaluation of the sensor values to determine the rotation angle of the magnetic source. Such an evaluation is regularly performed in the digital domain and employs well-known trigonometric operations or processing blocks like a CORDIC block. Such evaluation blocks are sometimes also referred as a Magneto Core. In order also to be able to determine potential failures in the Magneto Core, further evaluation of the difference value F can be performed.

Figure 4:
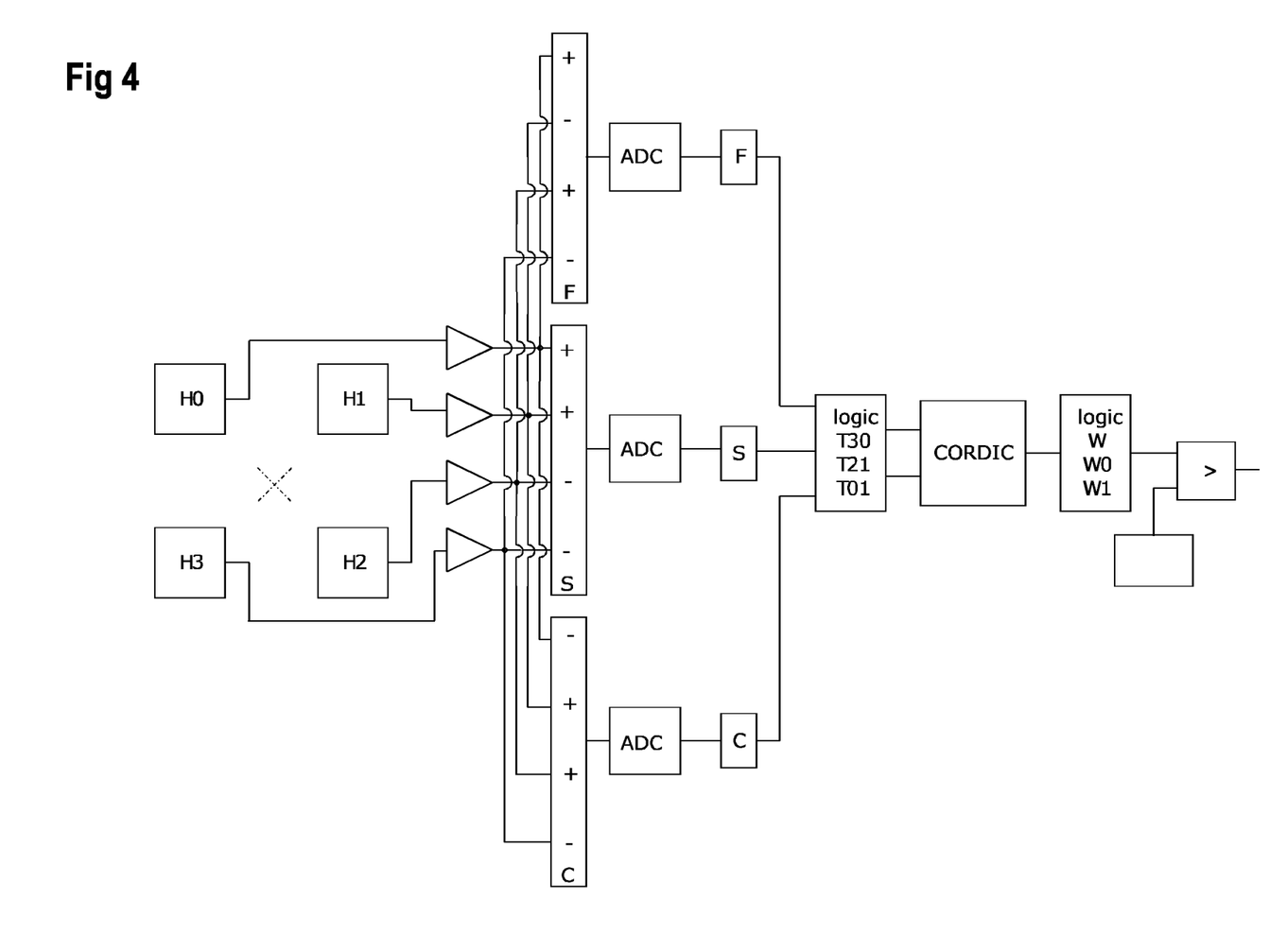
FIG. 4 shows a further example embodiment of a rotary sensor arrangement employing the failure detection concept.

For example, FIG. 4 shows a further example embodiment of a rotary sensor arrangement that is based on the embodiment of FIG. 2. In addition to the combination block for generating the difference value as shown in the embodiment of FIG. 2, the arrangement as shown in FIG. 4 additionally comprises two further combination blocks for generating a first component value S and a second component value C that represent orthogonal components associated with the magnetic field generated by the magnetic source. The first component value S may be associated with a sine channel, and the second component value C may be associated with a cosine channel.

For example, in this example embodiment, the first component value S is formed from a sum of differences of each pair, which can be expressed as $$S=(VH0-VH2)+(VH1-VH3).$$

The second component value C is calculated as a difference of the sensor values of the second pair and the difference of the sensor values of the first pair, which can be expressed as $$C=-(VH0-VH2)+(VH1-VH3).$$

The first and the second component value S, C are provided to the CORDIC block for determining the rotation angle, for example based on the improved arctangent function A TAN 2, which takes into account the quadrant of the angle to be determined. For example, the rotation angle of the magnetic source can be determined as $$W=A\ TAN\ 2\ (S,C).$$

Other implementations for determining an angle from the component values S, C may be used as well.

In addition, a first, a second and a third vector value T30, T01 and T21 are determined in a first logic block upstream to the CORDIC block. The determination is based on respective distinct combinations of the difference value F and the first and the second component value S, C. For example, the first vector value T30, the second vector value T01 and the third vector value T21 can be determined as follows:

$$T30=(VH0-VH3)=(S+F)/2$$

$$T21=(VH1-VH2)=(S-F)/2$$

$$T01=(VH1-VH0)=(C-F)/2$$

The three vector values T30, T01 and T21 and the two component values S, C are provided to the CORDIC block accordingly in order to calculate the rotation angle W as described before and further to determine a first and a second auxiliary angle W0, W1, e.g. according to the following formula:

$$W0=A\ TAN\ 2(T01,T30)$$

$$W1=A\ TAN\ 2(T21,T01)$$

The respective angle values W, W0 and W1 are provided to the logic block downstream of the CORDIC to determine a residual value FUSA based on these angle values. For example, the residual value FUSA is determined according to $$FUSA=ABS\ (90°-W0-W)+ABS\ (W1-W)$$

In the case that all sensors and processing blocks concerned up to this point are working properly and assuming ideal external conditions, the residual value FUSA should be zero. As described above for the tolerances of the difference value F, slight deviations of the residual value FUSA from the zero value are possible due to misalignment of the magnetic source, gradients of the external magnetic field etc. Accordingly, the residual value FUSA is compared to a threshold value, and a failure status is determined to be present if the residual value is greater than the threshold value. Accordingly, the respective threshold value may be programmed once or during operation of the arrangement. Hence, the sensitivity of this fail-safe mechanism is programmable to have a trade-off between the robustness to external disturbances and a detection sensibility.

Referring for example to the embodiment of FIG. 3, the failure status relates to the sensor portion of the arrangement, whereas in the embodiment of FIG. 4, the status relates to a processing portion. Accordingly, a failure status of the overall sensor arrangement can include a sensor status portion or a processing status portion or a combination of both. Consequently, the example embodiments of FIG. 3 and FIG. 4 can be combined to include both the comparison of the difference value F with a threshold value and the comparison of the residual value FUSA with a further threshold value.

Referring back to FIG. 4, in other, less complex implementations, the first and the second component value S, C can be calculated with less effort, thereby still allowing determination of the three vector values, the auxiliary angles and the residual value FUSA with slightly different equations as shown in the following. For example, in this alternative calculation, the first and the second component value S, C are calculated as the differences of the sensor values of the first respectively the second sensor pair, namely as $$S=VH0-VH2$$

$$C=VH1-VH3$$

Accordingly, the vector values T30, T21, T01 are calculated as $$T30=(VH0-VH3)=(C+S+F)/2$$

$$T21=(VH1-VH2)=(C+S-F)/2$$

$$T01=(VH1-VH0)=(C-S-F)/2$$

In any implementation, the result of the comparison with the threshold value, both for the difference value F and the residual value FUSA, corresponds to a bit signal for signaling an error condition, which may generate an error code from an interface of the sensor arrangement to an external device, to which the arrangement is connected. Such error code can be used to flag that the angular measurement is not reliable and probably wrong.

In order to reduce the number of signal combiners and therefore the overall effort for implementing the described functions, at least one signal chain can be multiplexed. In particular, the effort for the analog frontend can be reduced. For example, referring to FIG. 5, one of the channels for processing the component values, here the first component value S, is multiplexed with the processing chain of the difference value F.

Figure 6:
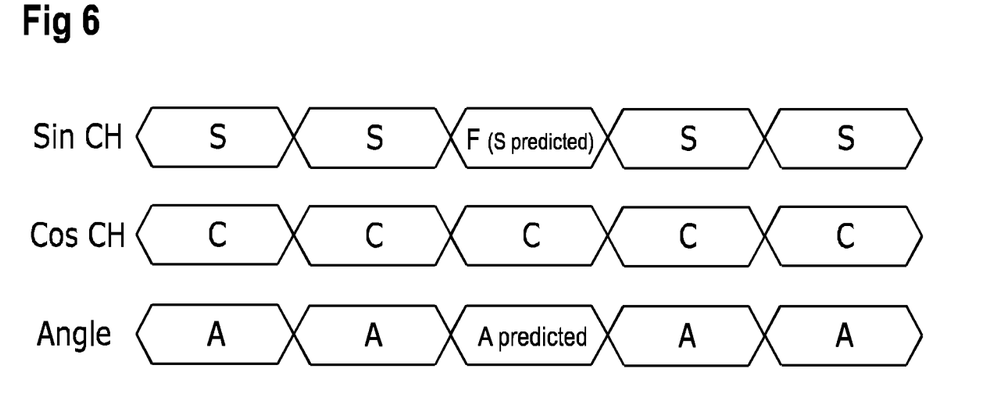
FIG. 6 shows an example processing time diagram.

Referring to FIG. 6, during such phases, where the difference value F is processed, a value for the first component value S is predicted, e.g. based on previous values in that channel. Hence, also a value A of the rotation angle is predicted during that time. The use of a predicted sine measurement, corresponding to the first component value S, gives a good approximation of the real angle that should be calculated, but the for the nature of the sine function, an exact prediction is not possible with linear interpolation even if the magnetic source is rotating at a constant speed.

For this reason, in the present example also a prediction of the output value A of angle W is performed to have an exact value given a constant rotation speed.

Figure 5:
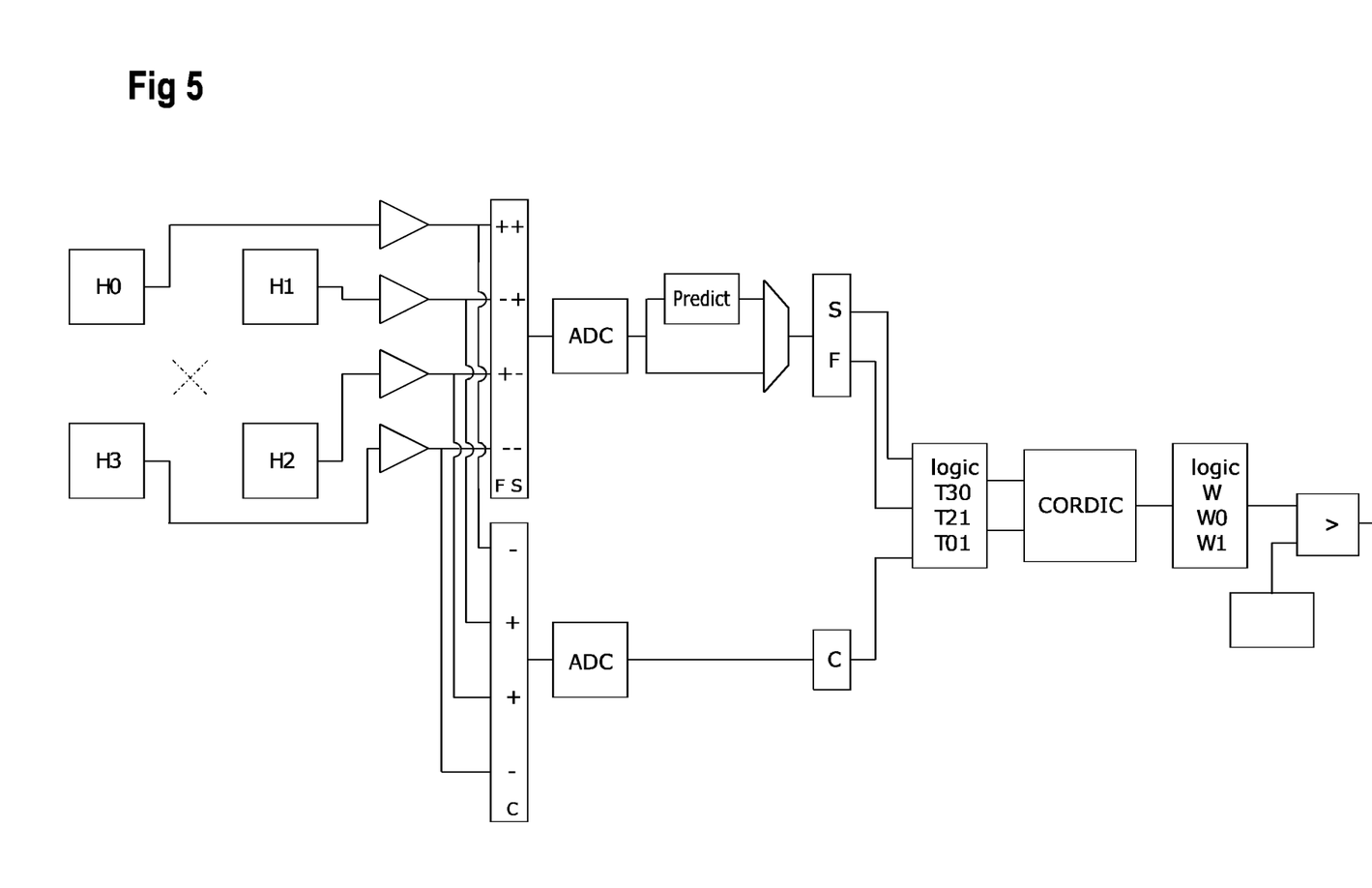
FIG. 5 shows a further example embodiment of a rotary sensor arrangement employing the failure detection concept.

Besides the prediction, the calculation of the vector values and the residual values as described in conjunction with FIG. 4 is the same in the example of FIG. 5.

Figure 7:
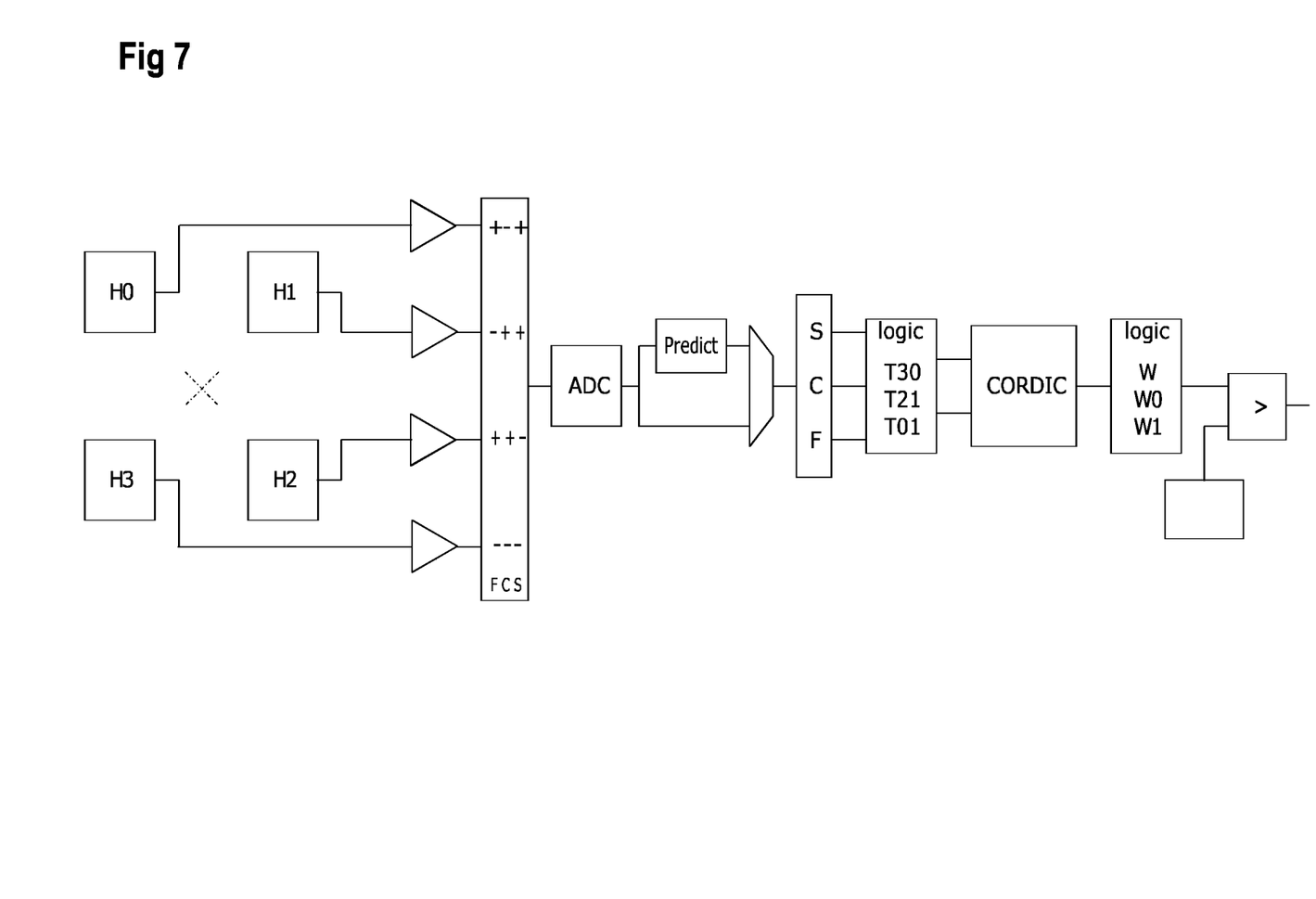
FIG. 7 shows a further example embodiment of a rotary sensor arrangement employing the failure detection concept.

Referring now to FIG. 7, the complexity in the number of combination blocks in the analog frontend is further reduced compared to the examples of FIGS. 4 and 5. Hence, only one processing channel is available for all three values, namely the first and the second component value S, C and the difference value F. Accordingly, the combination block acting as an analog frontend to the magnetic field sensors is configured to measure the three values F, S or C in an alternating fashion. The resulting values are converted into the digital domain and stored together.

Figure 8:
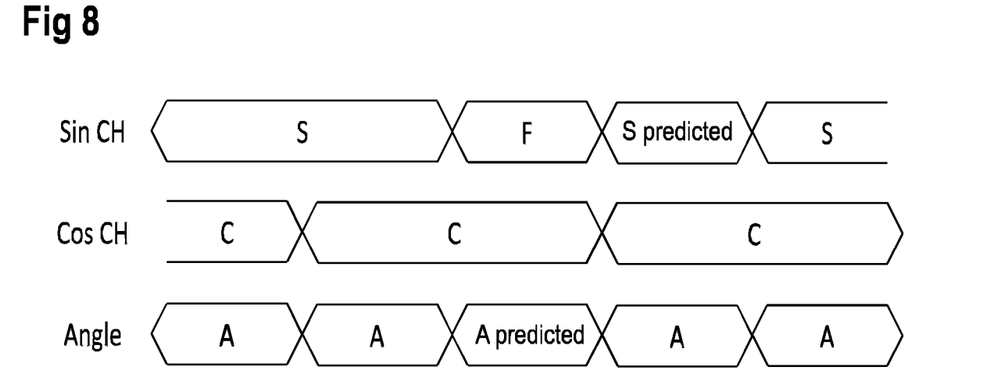
FIG. 8 shows a further example processing time diagram.
Figure 9:
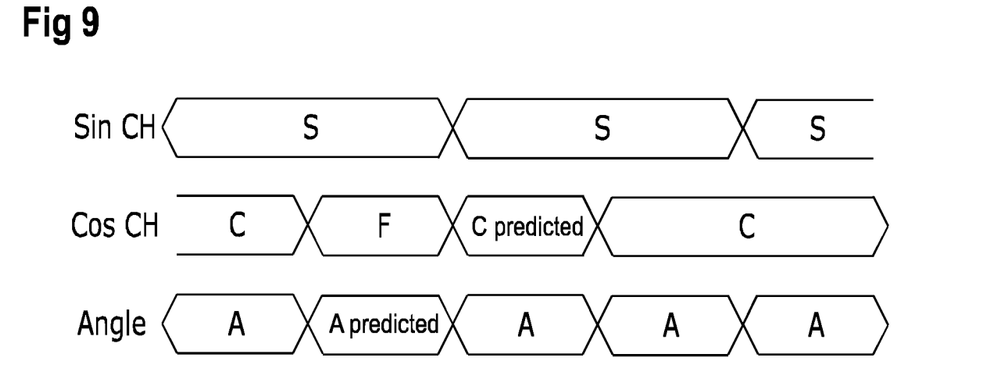
FIG. 9 shows a further example processing time diagram.

During the measurement for the difference value F, a predicted value for the first and the second component value S, C can be calculated, as shown in FIGS. 8 and 9 as two processing alternatives. Similar to the embodiment as described in conjunction with FIGS. 5 and 6, either the first or the second component value has to be predicted during calculation or generation of the difference value F. Also the value A for the angle W is predicted during the F measurement.

The frequency of execution of the additional measurement for the difference value F can be chosen arbitrarily, but should be chosen such that too much performance degradation on the regular angular measurement is avoided. For example, the measurement of difference value F can be performed every few milliseconds, which allows a failure detection within a given time required for failsafe applications.

In the example embodiments described above, the sensor arrangement was described to have exactly two pairs of magnetic field sensors, and the failure detection has been described based on that number of sensors. However, conventional rotary sensor arrangements may also be embodied with a higher number of magnetic field sensors, like six sensors arranged in three pairs or eight sensors arranged in four pairs.

Figure 10:
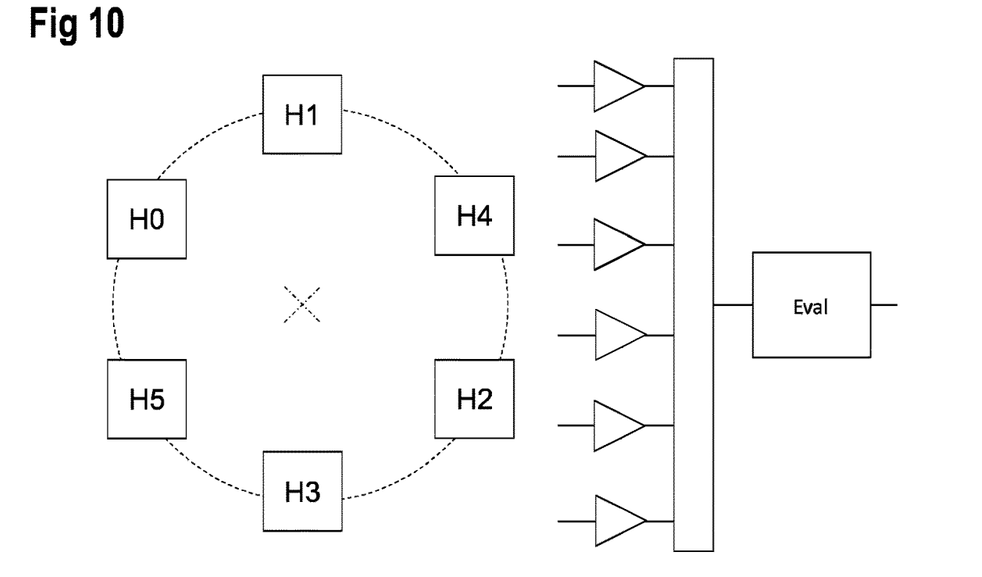
FIG. 10 shows a further example embodiment of a rotary sensor arrangement employing the failure detection concept.

The failure detection concept can also be applied to such arrangements, as indicated above. For example, FIG. 10 shows an example implementation with three pairs of magnetic field sensors, having an additional third pair with magnetic field sensors H4, H5 being arranged symmetrically with respect to the rotation axes.

Figure 11:
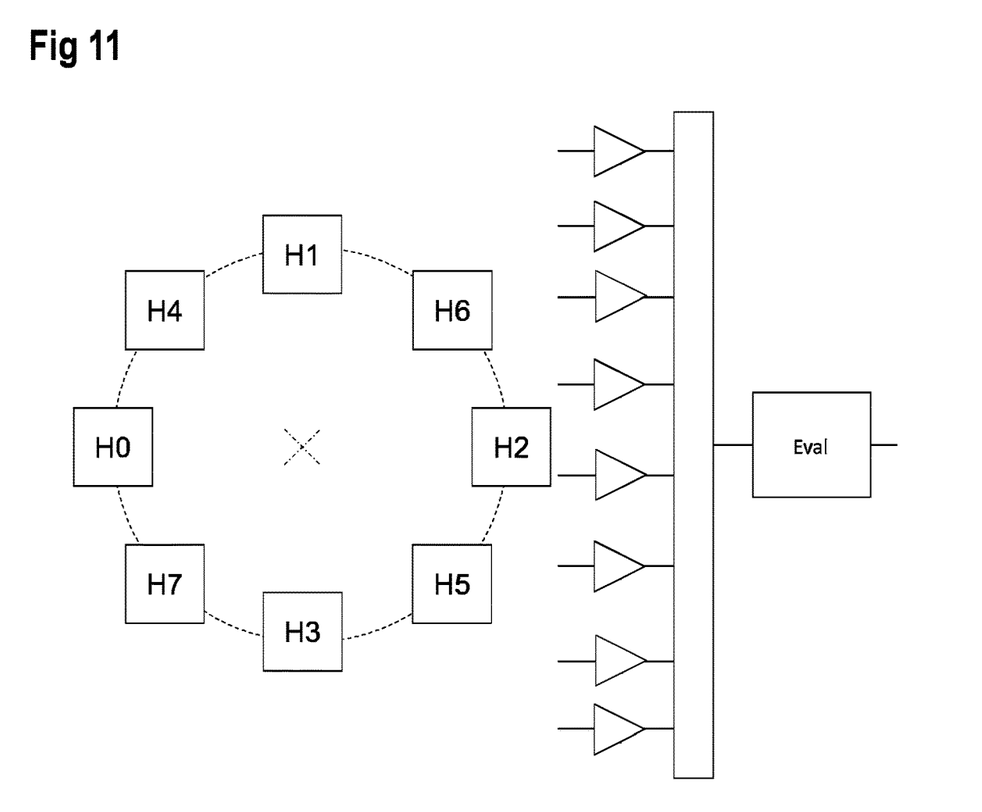
FIG. 11 shows a further example embodiment of a rotary sensor arrangement employing the failure detection concept.

FIG. 11 shows an example embodiment with four pairs of magnetic field sensors, having sensors H6, H7 as the fourth pair.

The same principles as described above also apply here. For example, assuming a basically constant homogeneous external field for all sensors, the sum of the sensor values of each pair only reflects the influences of the external magnetic field in an ideal configuration. Hence, the difference of the sum values of any two pairs will result in zero or approximately zero under such conditions, which allows to identify a failure status of the arrangement.

The difference value F may be calculated in the six sensor implementation of FIG. 10 e.g. as follows $$F=(VH0+VH2)-(VH1+VH3)+(VH4+VH5)$$

In the eight sensor implementation of FIG. 11, the difference value F may be calculated e.g. as follows $$F=(VH0+VH2)-(VH1+VH3)+(VH4+VH5)-(VH6+VH7)$$

A general rule may be to sum with the same sign the signals from the sensors placed in symmetric position. To avoid or reduce the influence of external magnetic field, the couple of sensors are summed with opposite sign.

It should be apparent to the skilled reader from the description above that several possibilities to combine the sum values of the sensor pairs to perform the failure determination are possible.

The same holds true for the calculation of the residual value in the digital signal processing, which requires slight adaptations to the equation given above.

We claim:

1. A rotary sensor arrangement configured to be used with a rotatable magnetic source, the sensor arrangement comprising
   a first pair of magnetic fields sensors arranged symmetrically with respect to a rotation axis, the magnetic field sensors of the first pair configured to provide a first and a second sensor value;
   a second pair of magnetic fields sensors arranged symmetrically with respect to the rotation axis, the magnetic field sensors of the second pair configured to provide a third and a fourth sensor value; and
   an evaluation unit configured
   to determine a first sum value corresponding to a sum of the first and the second sensor value;
   to determine a second sum value corresponding to a sum of the third and the fourth sensor value;
   to determine a difference value corresponding to a difference between the first and the second sum value;
   to compare the difference value or a value derived from the difference value to a threshold value
   to determine whether a failure status of the sensor arrangement is present based on the comparison result;
   to determine a first component value and a second component value based on at least the first, second, third and fourth sensor value,
   to determine a rotation angle based on the first component value and the second component value;

to determine a first, a second and a third vector value based on respective distinct combinations of the difference value and the first and second component value;

to determine a first auxiliary angle based on the first and the second vector value;

to determine a second auxiliary angle based on the second and the third vector value;

to determine a residual value based on the first and second auxiliary angle and the rotation angle; and to determine the failure status based on a comparison of the residual value with the threshold value or with a further threshold value.

2. The sensor arrangement according to claim 1, further comprising at least one further pair of magnetic fields sensors arranged symmetrically with respect to the rotation axis, the magnetic field sensors of the at least one further pair configured to provide respective sensor values, wherein the evaluation unit is configured to determine a respective further sum value corresponding to a sum of the respective sensor values of the at least one further pair of magnetic fields sensors, the further sum value contributing to the difference value.

3. The sensor arrangement according to claim 1, wherein the difference value is directly compared to the threshold value in the analog domain or in the digital domain, and wherein the failure status is determined to be present if the difference value is greater than the threshold value.

4. The sensor arrangement according to claim 1, wherein the failure status includes a sensor status portion and a processing status portion, the sensor status portion being determined based on the difference value, and the processing status portion being determined based on the residual value.

5. The sensor arrangement according to claim 4, wherein a failure of the sensor status portion is determined to be present if the difference value is greater than the threshold value, and a failure of the processing status portion is determined to be present if the residual value is greater than the further threshold value.

6. The sensor arrangement according to claim 1, wherein the determination of the difference value, the first component value and the second component value is at least partially performed in a time-multiplexed fashion.

7. The sensor arrangement according to claim 6, wherein one of the first component value and the second component value is determined by a prediction algorithm during determination of the difference value.

8. The sensor arrangement according to claim 6, wherein the rotation angle is determined by a prediction algorithm during determination of the difference value.

9. The sensor arrangement according to claim 1, wherein the first and the second sum value are determined according to $$SU1 = VH0 + VH2, \text{ and}$$

$$SU2 = VH1 + VH3,$$

with SU1 being the first sum value, SU2 being the second sum value, VH0 and VH2 being the first and the second sensor values, and VH1 and VH3 being the third and the fourth sensor values.

10. The sensor arrangement according to claim 9, wherein the difference value F is determined according to $$F = SU1 - SU2, \text{ or}$$

$$F = VH0 + VH2 - VH1 - VH3.$$

11. The method according to claim 1, wherein the failure status includes a sensor status portion and a processing status portion, the sensor status portion being determined based on the difference value, and the processing status portion being determined based on the residual value.

12. The method according to claim 11, wherein a failure of the sensor status portion is determined to be present if the difference value is greater than the threshold value, and a failure of the processing status portion is determined to be present if the residual value is greater than the further threshold value.

13. The method according to claim 1, wherein the determination of the difference value, the first component value and the second component value is at least partially performed in a time-multiplexed fashion.

14. The method according to claim 13, wherein one of the first component value and the second component value is determined by a prediction algorithm during determination of the difference value.

15. The method according to claim 13, wherein the rotation angle is determined by a prediction algorithm during determination of the difference value.

16. A method for determining a failure status of a rotary sensor arrangement with a first pair of magnetic fields sensors arranged symmetrically with respect to a rotation axis, with a second pair of magnetic fields sensors arranged symmetrically with respect to the rotation axis, and with a magnetic source arranged rotatable around the rotation axis, the method comprising determining a first sum value corresponding to a sum of a first and a second sensor value provided by the magnetic field sensors of the first pair;

determining a second sum value corresponding to a sum of a third and a fourth sensor value provided by the magnetic field sensors of the second pair;

determining a difference value corresponding to a difference between the first and the second sum value;

comparing the difference value or a value derived from the difference value to a threshold value determining whether the failure is present based on the comparison result;

determining a first component value and a second component value based on at least the first, second, third and fourth sensor value, determining a rotation angle based on the first component value and the second component value;

determining a first, a second and a third vector value based on respective distinct combinations of the difference value and the first and second component value;

determining a first auxiliary angle based on the first and the second vector value;

determining a second auxiliary angle based on the second and the third vector value;

determining a residual value based on the first and second auxiliary angle and the rotation angle; and determining the failure status based on a comparison of the residual value with the threshold value or with a further threshold value.

17. The method according to claim 16, wherein the difference value is directly compared to the threshold value in the analog domain or in the digital domain, and wherein the failure status is determined to be present if the difference value is greater than the threshold value.

18. The method according to claim 16, wherein the sensor arrangement further comprises at least one further pair of magnetic fields sensors arranged symmetrically with respect to the rotation axis, the method further comprising determining a respective further sum value corresponding to a sum of the respective sensor values of the at least one further pair of magnetic fields sensors, the further sum value contributing to the difference value.

19. The method according to claim 16, wherein the first and the second sum value are determined according to $SU1 = VH0 + VH2$, and $SU2 = VH1 + VH3$, with SU1 being the first sum value, SU2 being the second sum value, VH0 and VH2 being the first and the second sensor values, and VH1 and VH3 being the third and the fourth sensor values.

20. The method according to claim 19, wherein the difference value F is determined according to $F = SU1 - SU2$, or $F = VH0 + VH2 - VH1 - VH3$.

* * * * *